United States Patent
Wiest et al.

(10) Patent No.: US 9,528,866 B2
(45) Date of Patent: Dec. 27, 2016

(54) ULTRASONIC FLOW MEASURING DEVICE HAVING A SIGNAL PATH OF MULTIPLE STRAIGHT SUBSECTION HAVING A MINIMUM SEPARATION IN THE RANGE OF 0.4-0.6R FROM THE TUBE AXIS

(71) Applicant: Endress + Hauser Flowtec AG, Reinach (CH)

(72) Inventors: Achim Wiest, Weil am Rhein (DE); Sascha Grunwald, Steinen (DE); Oliver Brumberg, Rheinfelden (DE); Thomas Frohlich, Munchenstein (CH); Oliver Berberig, Grenzach-Wyhlen (DE); Beat Kissling, Reinach (CH); Quirin Muller, Munchenstein (CH)

(73) Assignee: Endress + Hauser Flowtec AG, Kagenstr., Reinach (CH)

( * ) Notice: Subject to any disclaimer, the term of this patent is extended or adjusted under 35 U.S.C. 154(b) by 31 days.

(21) Appl. No.: 14/414,813

(22) PCT Filed: Jun. 7, 2013

(86) PCT No.: PCT/EP2013/061813
§ 371 (c)(1),
(2) Date: Jan. 14, 2015

(87) PCT Pub. No.: WO2014/012707
PCT Pub. Date: Jan. 23, 2014

(65) Prior Publication Data
US 2015/0204704 A1 Jul. 23, 2015

(30) Foreign Application Priority Data
Jul. 16, 2012 (DE) .................. 10 2012 013 916

(51) Int. Cl.
*G01F 1/66* (2006.01)

(52) U.S. Cl.
CPC ............... *G01F 1/66* (2013.01); *G01F 1/662* (2013.01); *G01F 1/667* (2013.01)

(58) Field of Classification Search
None
See application file for complete search history.

(56) References Cited

U.S. PATENT DOCUMENTS

| | | | |
|---|---|---|---|
| 3,940,985 A | 3/1976 | Wyler | |
| 6,622,574 B2 * | 9/2003 | Fincke | G01F 1/44 702/50 |

(Continued)

FOREIGN PATENT DOCUMENTS

| | | |
|---|---|---|
| DE | 2616582 A1 | 10/1976 |
| DE | 29803912 U1 | 5/1999 |

(Continued)

OTHER PUBLICATIONS

German Search Report, German PTO, Munich, Germany, Mar. 14, 2013.

(Continued)

*Primary Examiner* — Harshad R Patel
(74) *Attorney, Agent, or Firm* — Bacon & Thomas, PLLC

(57) ABSTRACT

An ultrasonic, flow measuring device, comprising a measuring tube having a straight measuring tube axis, a transmitter for sending an acoustic signal on a first signal path, a receiver for receiving the acoustic signal on the first signal path and a number of reflection surfaces, on which the acoustic signal is reflected at least once on the first signal path, wherein minimum separations of at least three subsections from the measuring tube axis lie in the range 0.4-0.6 r, wherein r is the inner radius of the measuring tube.

24 Claims, 8 Drawing Sheets

(56) References Cited

U.S. PATENT DOCUMENTS

| | | | |
|---|---|---|---|
| 6,910,388 B2 * | 6/2005 | Jones | G01F 1/44 73/861.63 |
| 7,810,399 B2 | 10/2010 | van Klooster | |
| 7,810,401 B2 | 10/2010 | Brown | |
| 2003/0047007 A1 | 3/2003 | Baumoel | |
| 2011/0016985 A1 | 1/2011 | Stehouwer | |
| 2015/0160052 A1 * | 6/2015 | Wiest | G01F 1/662 73/861.27 |

FOREIGN PATENT DOCUMENTS

| | | |
|---|---|---|
| DE | 19808642 C1 | 8/1999 |
| DE | 102007063372 A1 | 7/2009 |
| EP | 0715155 A1 | 6/1996 |
| WO | 0244662 A1 | 6/2002 |
| WO | 2009083533 A2 | 7/2009 |
| WO | 2010002432 A1 | 1/2010 |

OTHER PUBLICATIONS

International Search Report, EPO, The Netherlands, Dec. 19, 2013.
English Translation of the International Preliminary Report on Patentability, WIPO, Geneva, CH, Jan. 29, 2015.

* cited by examiner

ULTRASONIC FLOW MEASURING DEVICE HAVING A SIGNAL PATH OF MULTIPLE STRAIGHT SUBSECTION HAVING A MINIMUM SEPARATION IN THE RANGE OF 0.4-0.6R FROM THE TUBE AXIS

TECHNICAL FIELD

The present invention relates to ultrasonic, flow measuring devices.

BACKGROUND DISCUSSION

Ultrasonic, flow measuring devices are applied widely in process and automation technology. They permit simple determination of volume flow and/or mass flow in a pipeline.

Known ultrasonic, flow measuring devices frequently work according to the travel-time difference principle. In the travel-time difference principle, the different travel times of ultrasonic waves, especially ultrasonic pulses, so-called bursts, are evaluated relative to the flow direction of the liquid. For this, ultrasonic pulses are sent at a certain angle to the tube axis both with as well as also counter to the flow. From the travel-time difference, the flow velocity and therewith, in the case of known diameter of the pipeline section, the volume flow can be determined.

The ultrasonic waves are produced, respectively received, using so-called ultrasonic transducers. For this, ultrasonic transducers are secured in the tube wall of the relevant pipeline section. There are also clamp on-ultrasonic, flow measuring systems. In the case of these systems, the ultrasonic transducers are pressed externally on the tube, or pipe, wall. A great advantage of clamp-on, ultrasonic, flow measuring systems is that they do not contact the measured medium and can be placed on an already existing pipeline.

Ultrasonic transducers are normally composed of an electromechanical transducer element, e.g. a piezoelectric element, and a coupling layer. The ultrasonic waves are produced in the electromechanical transducer element as acoustic signals and, in the case of clamp-on systems, led via the coupling layer to the tube wall and from there into the liquid, or, in the case of inline systems, they are in-coupled via the coupling layer into the measured medium. The coupling layer is also, not so frequently, called the membrane.

Arranged between the piezoelectric element and the coupling layer can also be another coupling layer, a so called adapting, or matching, layer. The adapting, or matching, layer performs, in such case, simultaneously the function of transmitting the ultrasonic signal and reducing reflection at interfaces between two materials caused by different acoustic impedances.

Both in the case of clamp-on systems as well as also in the case of inline systems, the ultrasonic transducers are arranged on the measuring tube in a shared plane, either on oppositely lying sides of the measuring tube, in which case the acoustic signal extends, projected on a tube cross section, once along a secant through the measuring tube, or on the same side of the measuring tube, in which case the acoustic signal is reflected on the oppositely lying side of the measuring tube, whereby the acoustic signal traverses twice through the measuring tube along the secant projected on the cross section through the measuring tube. U.S. Pat. Nos. 4,103,551 and 4,610,167 disclose ultrasonic, flow measuring devices with reflections on reflection surfaces provided therefor in the measuring tube. Also multipath systems are known, which have a number of ultrasonic transducer pairs, each of which forms a signal path, along which the acoustic signals travel through the measuring tube. The respective signal paths and the associated ultrasonic transducers lie, in such case, in mutually parallel planes and parallel to the measuring tube axis. U.S. Pat. Nos. 4,024,760 and 7,706,986 show, by way of example, such multipath systems. An advantage of multipath systems is that they measure the profile of the flow of the measured medium in the measuring tube at a number of locations and can thereby provide highly accurate measured values for the flow. This is achieved, among other things, also by weighting the individual travel times along the different signal paths differently. Disadvantageous in the case of multipath systems are, however, their manufacturing costs, since a larger number of ultrasonic transducers and, in given cases, a complex evaluating electronics need to be installed.

Different proposals have been made for weighting the signal paths. The paper, "Comparison of integration methods for multipath acoustic discharge measurements" by T. Tresch, T. Staubli and P. Gruber, in the handout for the 6th International Conference on Innovation in Hydraulic Efficiency Measurements, 30 Jul.-1 Aug., 2006, in Portland, Oreg., USA, compares established methods for weighting the travel times along different signal paths for calculating flow.

German patents DE 198 61 073 A1 and DE 297 19 730 U1 each disclose a flow measuring system having a first sound path, which is reflected a number of times in the measuring tube.

U.S. Pat. No. 7,845,240 and European Patent, EP 2 282 178 A1, each disclose a flow measuring device, which, starting from a transmitter, transmits a first signal path, which sends a signal via a double refraction a receiver. Then, the receiver becomes a transmitter and sends an ultrasonic signal on a second signal path by means of a double reflection or multireflection back to the original transmitter, which has in the meantime become a receiver. This measuring arrangement includes a signal evaluation, which takes into consideration the values of the first and second signal paths. Disadvantageous in this situation is that during the course of traversing the first and second signal paths the properties of the flow have already changed, so that, for example, a rotation of the medium in the measuring tube is not taken into consideration, since it is registered only in one direction, however, not in the opposing direction.

European Patent, EP 0715 155 A1 has a measuring arrangement with multiple refraction, wherein the subsections of the signal path form only one plane, which extends parallel to the measuring tube axis. Because of this, for example, a rotation of the medium in the pipe cannot be compensated.

Published International Patent Application, WO 02/44662 A1 discloses a flow measuring device, in the case of which a signal is guided by multireflection on a signal path through a measuring tube. In such case, the path portions of the signal path form a single plane, which extends parallel to the measuring tube axis. Also here, for example, no compensation of rotation can occur. In such case, indeed, subsections of a signal path extend on a shared plane, but these subsections do not follow directly one after the other.

German Patent, DE 298 03 912 U1 shows in FIG. 2 a signal path with two directly sequential and therewith corresponding subsections 10 and 11, which lie on the same plane. Other directly mutually corresponding subsections, which lie on a shared plane, are not disclosed in this publication, since the two subsections 5 and 14 do not correspond with one another.

Published International Patent Application, WO 2010/002432 A1 has an arrangement of transducers, however, no reflection surfaces.

Published International Patent Application, WO 1995012110 A1 shows an ultrasonic, flow measuring device with a measuring tube with planar walls and a straight measuring tube axis and at least one reflection surface in the measuring tube with a surface normal on this reflection surface, which has three non-zero components in a right angled coordinate system, whose one axis corresponds to the measuring tube axis. The document teaches that an ultrasonic signal with a predetermined width, which is clearly greater than a dot shaped signal, has a Gauss shaped sensitivity distributed over this width and is used for flow measurement. The width of the signal corresponds, in such case, approximately to the width of the rectangular measuring tube. If such a signal would now extend through the measuring tube parallel to the side walls, the region with the highest sensitivity would extend through the middle region of the measuring tube, and, thus, also record the higher flow velocities with higher values. In the case of very small flow velocities, this would lead to measurement error. The document teaches, consequently, further, to irradiate the measuring tube largely homogeneously by leading the ultrasonic signals through all regions of the measuring tube by means of oriented reflections. For illustration, the broad ultrasonic signal was represented by individual beam portions. The path lengths of the individual beam portions are equally long, so that the beam portions do not cancel by interference.

SUMMARY OF THE INVENTION

An object of the invention is to provide an ultrasonic, flow measuring device, which reliably registers flow also in the case of upstream disturbances, especially disturbances of a plant or process related nature, and which, in such case, can be manufactured cost effectively.

The object is achieved by an ultrasonic, flow measuring device comprises a measuring tube having a straight measuring tube axis, a transmitter for sending an acoustic signal on a first signal path, a receiver for receiving the acoustic signal on the first signal path and a number of reflection surfaces, on which the acoustic signal on the first signal path is reflected at least once, wherein this first signal path is composed of straight subsections, wherein
a) minimum separations of at least three subsections from the measuring tube axis lie in the range 0.4-0.6 r, wherein r is the inner radius of the measuring tube;
b) wherein a first subsection, which defines a first axially parallel plane, has a directly corresponding second subsection, which defines a second axially parallel plane, which two planes extend through a reflection surface and the normal vectors enclose an angle of less than 10°,
c) wherein a third subsection, which defines a third axially parallel plane, has a directly corresponding fourth subsection, which defines a fourth axially parallel plane, wherein the two planes extend through a second reflection surface and the normal vectors enclose an angle of less than 10°; and
d) wherein the signal path describes in axial plan view a polygon, whose lateral points of intersection lie within, on or outside of the measuring tube.

In such case, the signal path advances in steps b) and c) in the axial direction. By the beam path defined in features b) and c), a rotary movement of the flow is compensated both in the negative as well as also in the positive direction.

The signal path in the form of a polygon creates a closed signal path and, thus, enables a symmetric registering of flow effects.

It is advantageous when the third and fourth reflection surfaces are arranged one after the other on or in the measuring tube parallel to the measuring tube axis, and a fifth reflection surface and either
i. the transmitter or
ii. the receiver or
iii. a sixth reflection surface
are arranged one after the other on or in the measuring tube parallel to the measuring tube axis, wherein the signal path is composed of six or less straight sub paths. The sixth reflection surface can be the position of the transmitter or the receiver. This compact, symmetric arrangement leads to a secure arrangement of the reflection surfaces on or in the measuring tube of the flow measuring device without extra calculating of displacement angles.

It is advantageous when the transmitter, the receiver and the reflection surfaces are arranged or oriented in such a manner relative to one another in or on the measuring tube that the signal path describes in axial plan view essentially a triangle, whose leg points of intersection lie within, on or outside of the measuring tube wall and that the first and second subsections of the signal path extend along a first leg of the triangle, wherein the first and the second subsections of the signal path are subsections following one after the other, and that the third and fourth subsections of the signal path extend along a second leg of the triangle, wherein the third and the fourth subsections of the signal path are subsections following one after the other. The angle specifications of a triangle lead in the case of the bores in the measuring tube or in the case of their arrangement on the measuring tube to only small error deviations. Additionally, the bores can due to the symmetric character be formed, for example, based on templates. On the whole, this procedure leads to better manufacturing tolerances and higher manufacturing speeds.

Optimally, the second subsection is formed by reflection of the first subsection on a first of the reflection surfaces and the fourth subsection is formed by reflection of the third subsection on a second of the reflection surfaces. The means that the first and second planes lie, apart from very small manufacturing tolerances of less than 0.1°, on one another.

Measurements have shown that an increasingly better compensation of rotational movements occurs, when the angle between the axially parallel planes according to the features b) and c) is small. Therefore, it is advantageous when the two planes extend through a second reflection surface and the normal vectors enclose an angle of less than 5°, preferably less than 2°, especially preferably less than 0.2°.

For an optimally symmetric registering, the subsection bisecting points of at least three subsections have a separation of 0.45-0.55 r, preferably 0.48-0.52 r, from the measuring tube axis, wherein r is the inner radius of the measuring tube.

In especially compact construction, the signal path of the polygon is formed by a total of six subsections of the signal path. In this way, a miniaturizing of known devices becomes possible.

According to the invention, an ultrasonic, flow measuring device comprises a measuring tube having a straight measuring tube axis, a transmitter for sending an acoustic signal on a first signal path and a receiver for receiving the acoustic signal on the first signal path and at least one reflection surface, on which the acoustic signal is reflected at least once on the first signal path, wherein this first signal path is composed of straight subsections, wherein the measuring tube has a first portion of reduced inner diameter for flow compensation.

In this way, there occurs both a flow profile flattening as well as also a determining of the flow velocity and/or of the volume flow in the case of flows, which due to upstream disturbances have a nonuniform mass distribution.

Advantageous embodiments of the invention are subject matter of the dependent claims In such case, the effect of flow compensation of claim 9 can be especially advantageously combined with rotation compensation of flow as claimed in claim 1 in one device It is advantageous when the signal path extends within the first portion of the measuring tube, since at this point a flow profile flattening has already occurred and, thus, a better determining of flow velocity or volume flow can occur.

It is advantageous when the angle of inclination between a second portion of the measuring tube with greater inner diameter and the first portion with reduced inner diameter amounts to less than 15°, preferably less than 10°, especially 6-8°. At angles beneath 6°, no significant flow profile flattening is noticeable. Angles above 15° lead increasingly to flow disturbances. Flow disturbance in a predominant part of liquids is prevented by a transition with an angle of inclination of less than 10°, wherein the angle of inclination is generally to be understood as the falling angle from the initially parallel internal tube wall at the inlet of the measuring tube.

In a preferred embodiment, the measuring tube includes a front portion for rectifying the flow. This front portion has preferably the same tube diameter as the diameter of the pipe to be connected to. The measuring can occur in the rear portion. In this way, in the case of especially strongly disturbed flows, a rectification is enabled before the actual measuring, without requiring additional components outside of the measuring tube.

BRIEF DESCRIPTION OF THE DRAWINGS

Preferred examples of embodiments of the invention will now be explained in greater detail based on the appended drawing, the figures of which show as follows.

DETAILED DISCUSSION IN CONJUNCTION WITH THE DRAWINGS

Figure 8:
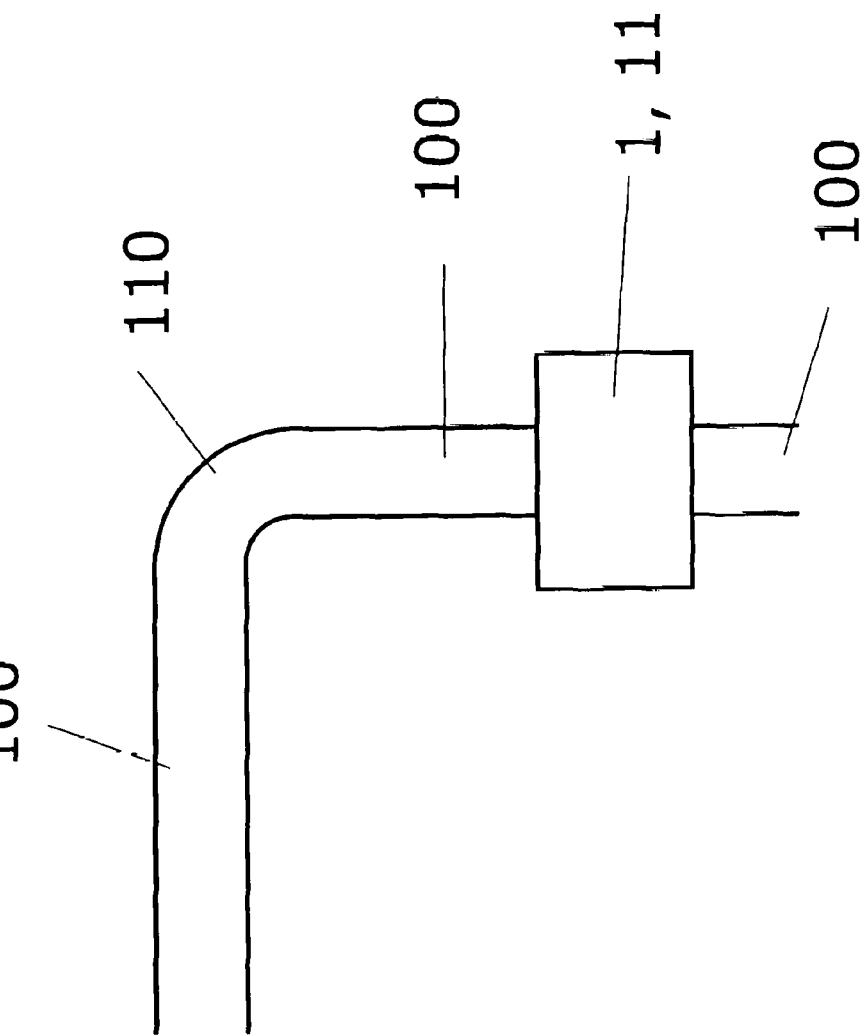
FIG. 8 shows an ultrasonic, flow measuring device located downstream of a bent region of a pipeline.

FIGS. 1-4 show the construction of an ultrasonic, flow measuring device 1 and an optimal signal path 8, which is composed in the present case of six straight subsections 8.1 to 8.6. The ultrasonic, flow measuring device includes a measuring tube 2, which can be connected terminally via flanges 3 to respective segments of a pipeline 100. The pipeline 100 has a bent part 110 as shown in FIG. 8. The flow measuring device 1, 11 is located downstream in the straight portion of pipeline 100.

The measuring tube includes in the region of the flanges 3 a second portion 4 with a measuring tube inner diameter $d_1$. Second portion 4 tapers narrower in the direction toward the half length of the measuring tube to a first portion 5 with an inner diameter $d_2$.

Figure 1:
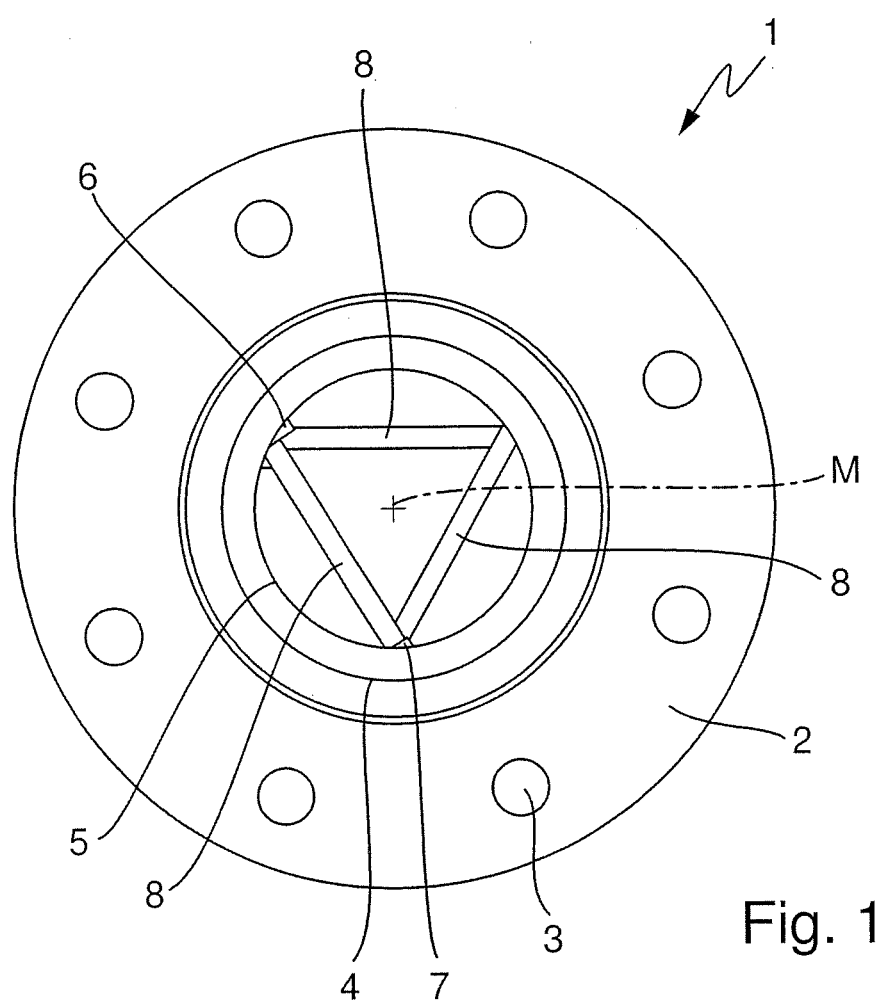
FIG. 1 is an axial plan view of an ultrasonic, flow measuring device of the invention.
Figure 2:
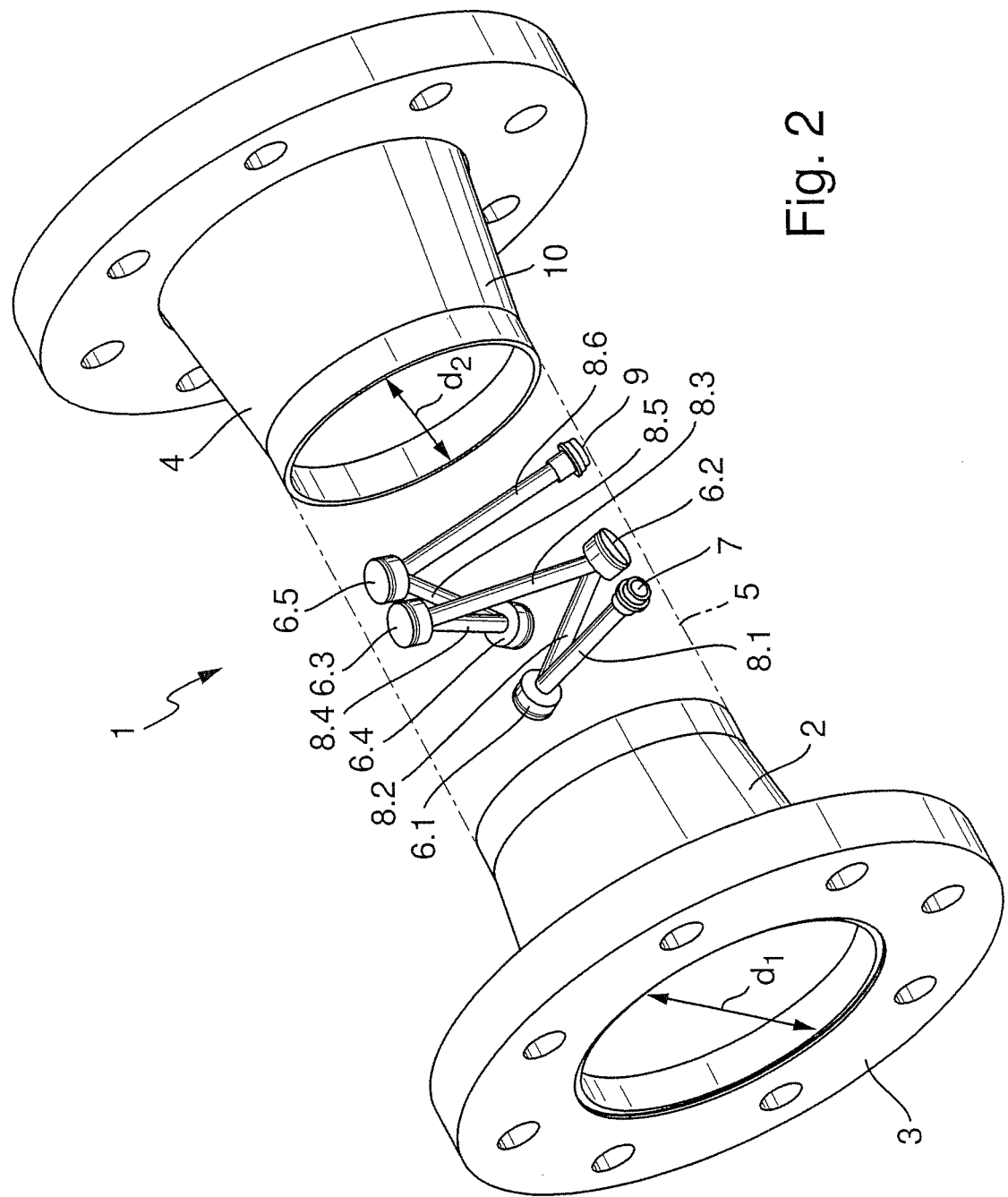
FIG. 2 is a sectioned perspective view of the ultrasonic, flow measuring device.
Figure 3:
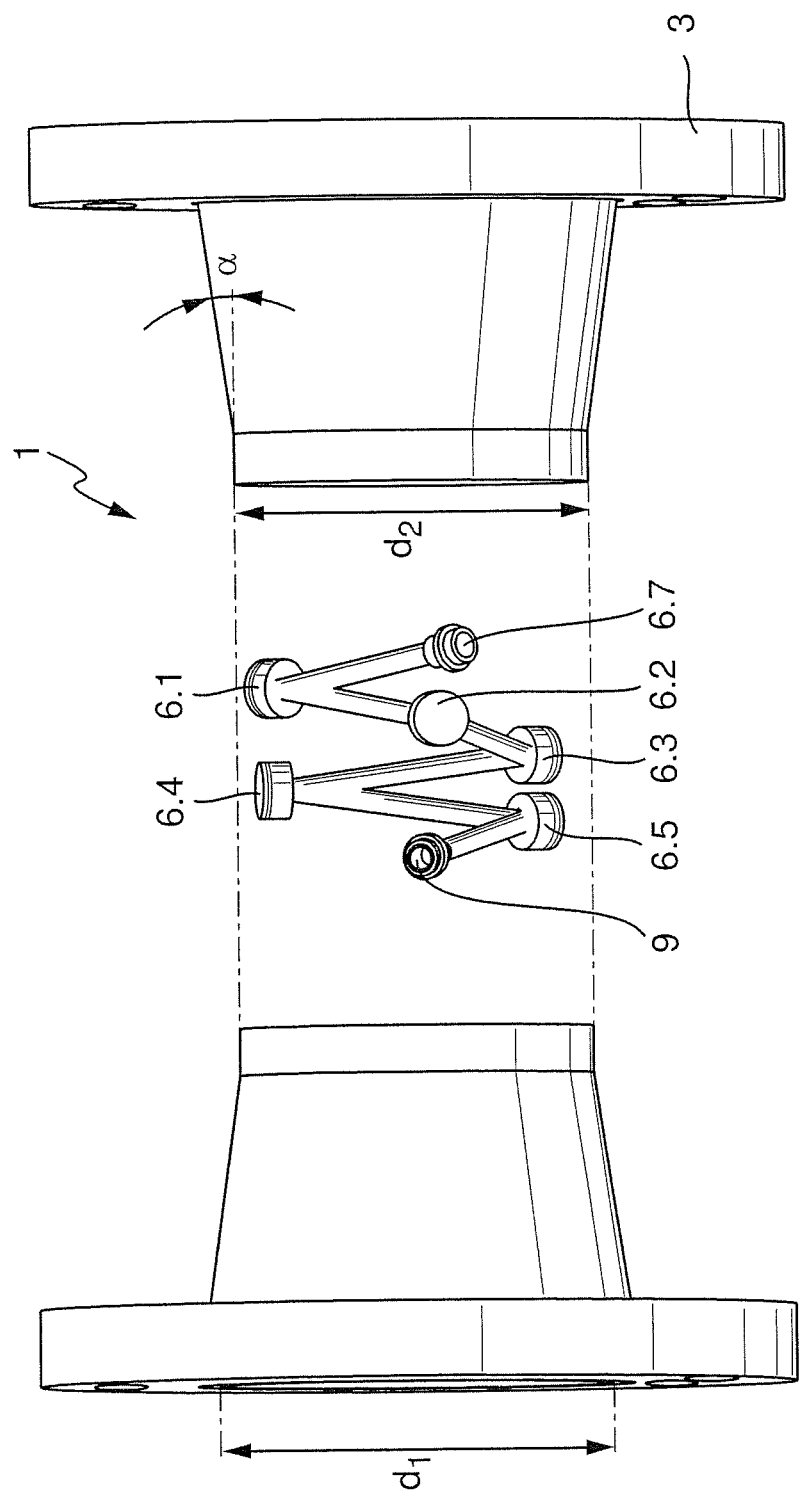
FIG. 3 perspective view with sectioned portion of the ultrasonic, flow measuring device of the invention.
Figure 4:
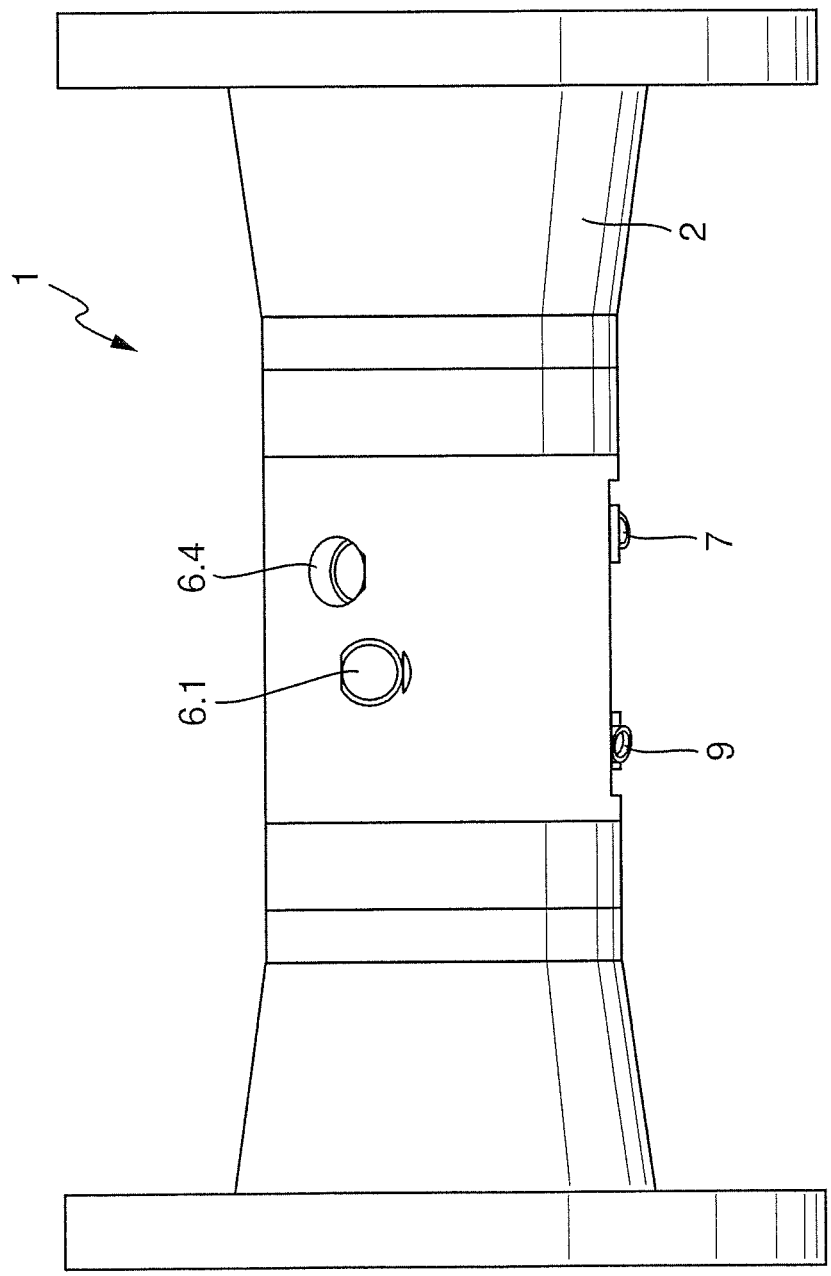
FIG. 4 is a side view of the basic body of the ultrasonic, flow meter.

Arranged in the measuring tube 2 along this first portion 5 in the concrete example of an embodiment shown in FIGS. 1-3 are two ultrasonic transducers 7 and 9, as well as five reflectors 6.1 to 6.5.

Alternatively, instead of the receiver also a further, sixth reflector can be provided, which enables a leading of the signal back along the second signal path.

Alternatively thereto, however, also the ultrasonic transducers and/or the reflectors can be arranged only on the measuring tube.

Reflectors 6.1 to 6.5 are especially advantageously reflectors with concave surfaces, since such counteracts dispersion of the ultrasonic signal in the case of greater flow velocities.

The transition 10 from the second portion 4 with greater diameter $d_1$ into the first portion 5 with smaller diameter $d_2$ provides a flattening of the flow profile. The angle of inclination $\alpha$ of the transition 10 amounts preferably to less than 15°, preferably less than 10°, especially 6-8°. This is advantageous, for example, when the medium to be measured has earlier passed a disturbance, for example, a bend. In this case, due to the inertia of the medium, a greater mass of the medium acts on one wall region of the measuring tube 2 compared with an oppositely lying wall region. For erasing this effect, usually a flow rectifier is used. The measuring device of the invention, however, provides a flow profile flattening without needing an upstream flow rectifier. This leads to a wider spectrum of application and to a smaller space requirement in the case of inserting ultrasonic, flow measuring devices into pipelines. Corresponding disturbances, besides bends, can also include deposits or other objects in the pipeline, e.g., at withdrawal locations, the effects of which can equally be cancelled without additional components. The basic characteristic of the flow is retained.

Additionally to the occurrence of non-uniform mass distribution of the medium, disturbances can also frequently result in vortices and other rotational movements.

These are compensated through a double reflection of at least two straight subsections 8.1 and 8.4 of the signal path. The particular signal route of the example of an embodiment presented in FIGS. 1-3 will now be described in the following in greater detail.

Starting from the ultrasonic transducer 7, which is the transmitter, an ultrasonic signal is transmitted into the measuring tube. The signal route through the measuring tube between the ultrasonic transducer 7, to the extent that such functions as transmitter, and the ultrasonic transducer 9, to the extent that such functions as receiver, is a first signal path.

A second signal path is the signal route from the ultrasonic transducer 9, as transmitter, to the ultrasonic transducer 7, as receiver, and is not considered in the following in greater detail.

The ultrasonic signal on the first signal path completes a first subsection 8.1 on the first signal path 8, is reflected on the reflection surface 6.1 and then travels a second subsection 8.2 on the first signal path 8.

The first subsection has, in such case, a separation of 0.4-0.6 r from the measuring tube axis, wherein r is the inner radius of the measuring tube. In the optimal case illustrated in FIG. 1, in which the signal path describes an equilateral triangle, which has its vertices at the reflection surfaces, the separation from the measuring tube axis amounts to 0.5 r.

The separation can, however, also be more or less, so that the triangle, respectively its vertices, lie within or outside of the measuring tube.

The first and second subsections 8.1 and 8.2 lie ideally on one and the same axially parallel plane, such as is likewise indicated in FIG. 1.

In a less ideal case, the first subsection 8.1 lies in a first axially parallel plane. The second subsection directly following the first subsection then lies in a second axially parallel plane. In such case, the signal path progresses in the axial direction. Both planes extend through the first reflection surface 6.1. With the reflection surface as the vertex, the planes and enclose only a small angle of less than 10° between them, so that the planes, except for this slight angular displacement, extend almost parallel to one another.

The beam path of subsections 8.1 and 8.2 includes, thus, according to the invention, a reflection back of the subsection 8.1 in the same plane or almost the same plane whereby a rotating flow in a first rotational direction can be metrologically registered and/or compensated.

A third subsection 8.4 is traveled by the ultrasonic signal in FIG. 2 on the first signal path 8 between the reflectors 6.3 and 6.4. This is reflected on the reflection surface 6.4 and then travels to a fourth subsection 8.5 on the first signal path 8 up to the reflector 6.5.

The third subsection has likewise a separation of 0.4-0.6 r from the measuring tube axis, wherein r is the inner radius of the measuring tube. The separation in the present case amounts to 0.5 r, for example.

The separation can, however, also be more or less, so that the triangle, respectively its vertices, lie within or outside of the measuring tube.

Also, in the present case, there is a reflection back, such as already described in the case of the first subsection 8.1.

The beam path of the subsections 8.4 and 8.5 provides, thus, according to the invention, a reflection back of the subsection 8.4 in the same or almost the same plane, whereby a rotating flow in a second rotational direction can be metrologically registered and/or compensated.

This second rotational direction is preferably opposite to the first rotational direction, so that a complete compensating of the rotational fractions of the flow can occur.

For a symmetric registering of the position of the flow and for registering symmetric vortices, it is, finally, necessary that the signal path describes, in axial plan view, a polygon, whose lateral points of intersection lie within, on or outside of the measuring tube.

This polygon is optimally a triangle. It can, however, due to displacement of the planes relative to one another, also be embodied as a polygon of more than three sides.

This displacement can occur, for example, as a result of production related deviations.

To recapitulate concerning the above described reflections, there occurs in FIG. 2, first of all, a reflection of an ultrasonic signal emitted by the transmitter 7 onto the subsection 8.1, from the subsection 8.1 to the subsection 8.2. Then, the transmitted ultrasonic signal travels the subsection 8.3. Finally the ultrasonic signal is reflected back a second time from the subsection 8.4 to the subsection 8.5. As a result of another reflection, the ultrasonic signal is finally transmitted to the receiver 9. On the whole, the ultrasonic signals travel, thus, six subsections, whereby an especially compact construction of an ultrasonic, flow measuring device becomes possible. Additionally, a correction over a very broad range of flow numbers is enabled.

By the closed signal path in combination with the double back reflection, thus, rotating flows with vortices can be reliably registered, such as can occur, for example, after disturbances in the pipe, for example, tube bends, 90° elbows, etc. This registering of rotating flows combines optimally with the earlier described flow compensation by narrowing of the inner diameter of the measuring tube wall within the measuring tube, in order to compensate disturbances for measuring.

Figure 5:
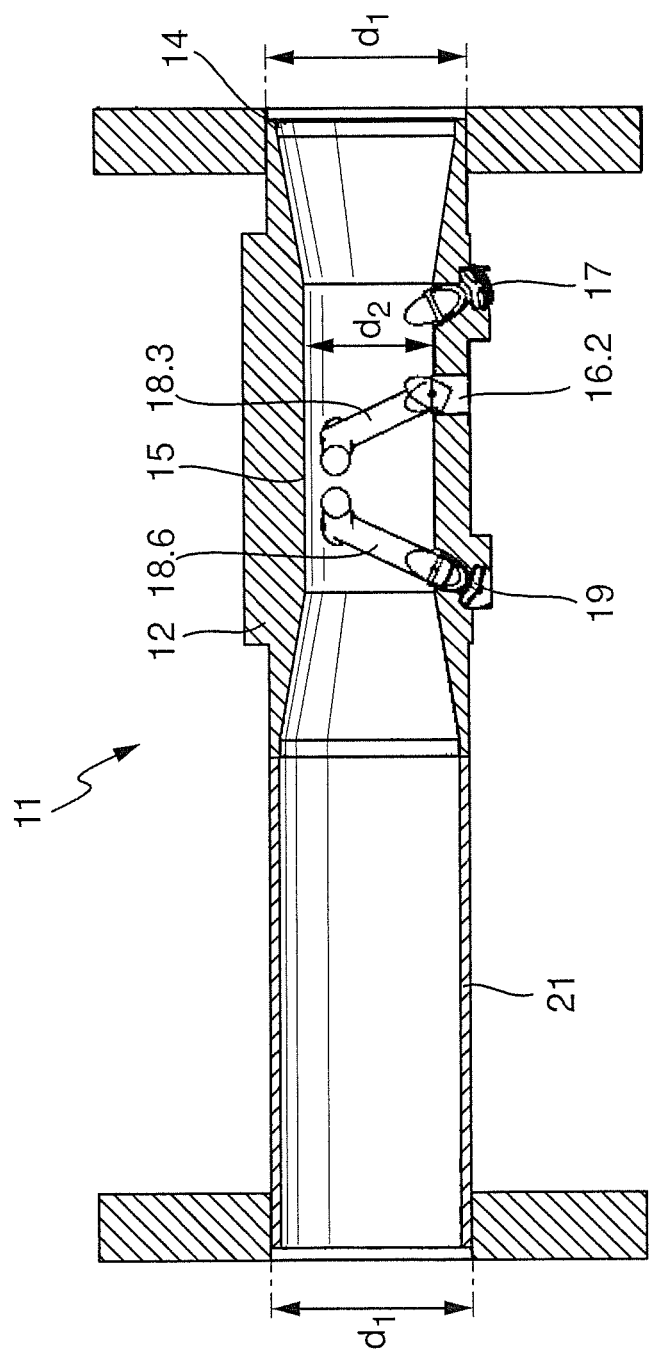
FIG. 5 is a side view of a second ultrasonic, flow meter with sectioned portion.

FIG. 5 shows a second example of an embodiment of a flow measuring device 11 of the invention with asymmetrical construction with a signal route essentially the same as in FIGS. 1-4, wherein in this case a front part, respectively portion, in the form of a tube segment 21 with constant tube diameter $d_1$ is arranged for a first rectification of the flow and ultrasonic transducers 17, 19 and reflectors 16.1, 16.2 are provided in the rear part, respectively portion, of the measuring tube.

By compact construction of the signal path 18, thus, already existing tube diameters can be utilized in the front portion as an inlet path for a flow quieting. From the tube segment 21, thus the front portion of the measuring tube 12, there follows in the flow direction a transition 20, which tapers with an angle of inclination of 10° into a first portion with narrowed inner diameter $d_2$.

Figure 6:
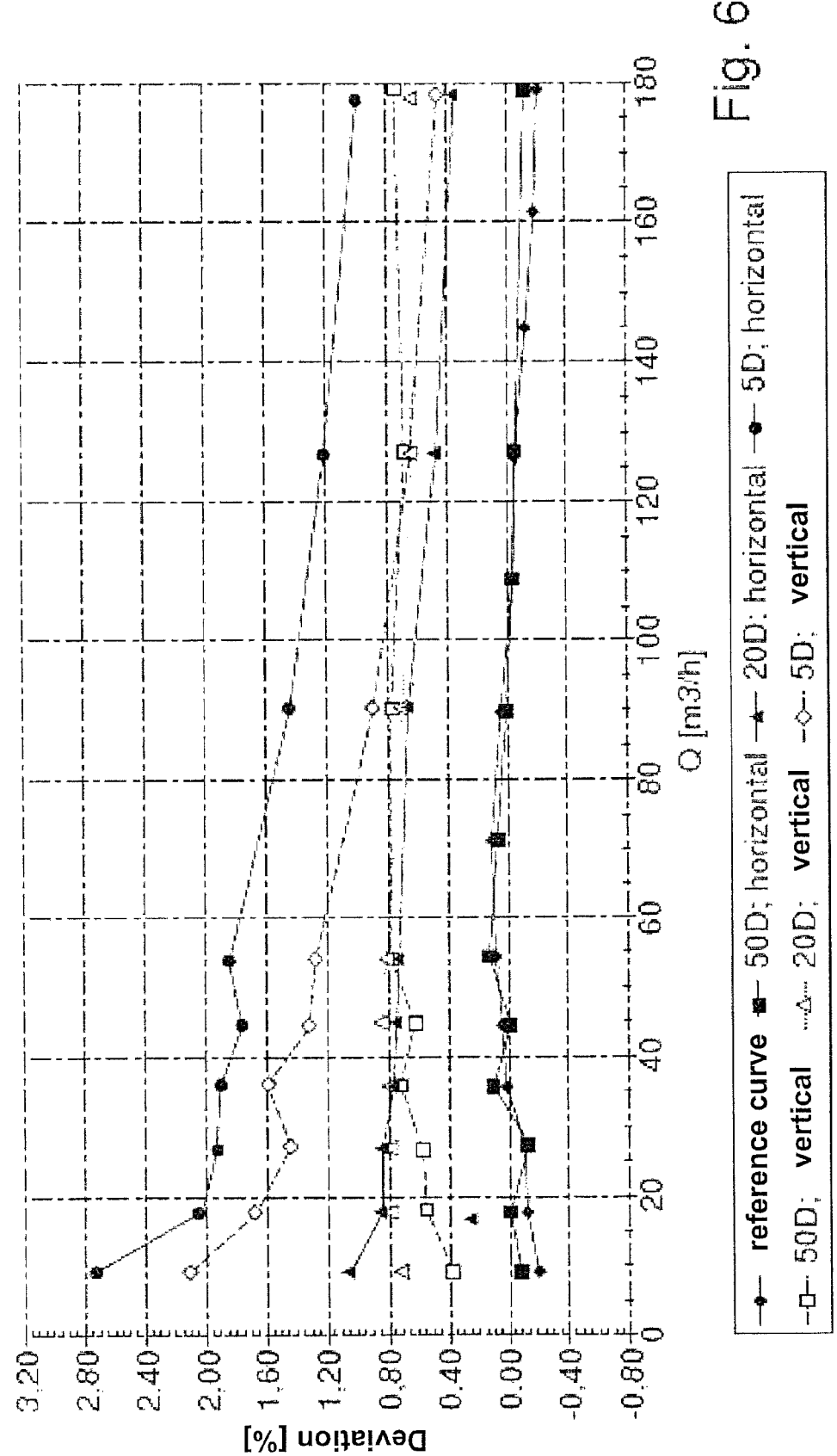
FIG. 6 is a graph of flow deviation versus volume flow in the case of per se known, two-path, ultrasonic, flowmeters.

FIG. 6 shows a graph, wherein deviation in % is plotted against measured volume flow in m3/h for deviations from the theoretical ideal case of a fluid conducting line without disturbances. The reference curve is the actual deviation in the case of a line without disturbances. The respective curves represent measurements of a known 2-path ultrasonic, flow measuring device in the case of a fall tube with a 90° bend.

5D stands for a separation of the ultrasonic, flow meter from the disturbance of 5 times the diameter of the tube.

20D is for a separation from the disturbance of 20 times the diameter of the tube and 50D for 50 times the diameter of the tube.

The dashed lines indicate a vertical bend and a thereafter vertically arranged ultrasonic, flow meter. The distances 5D, 20D and 50D designate again the separation of the 2-path ultrasonic flow meter from the bend.

Figure 7:
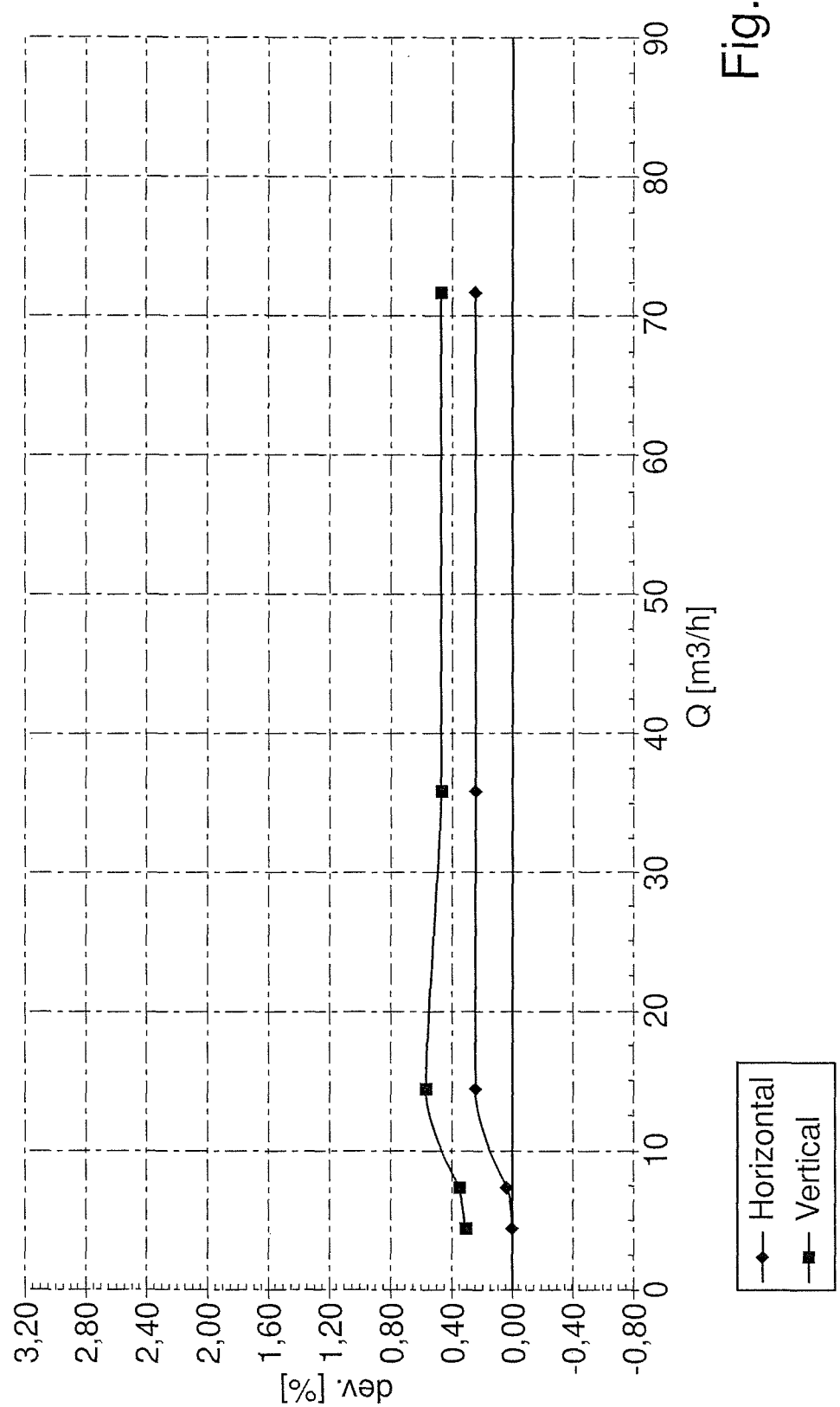
FIG. 7 is a graph of flow deviation versus volume flow in the case of an ultrasonic, flow meter of the invention.

FIG. 7 shows a graph recorded under conditions analogous to FIG. 6, however, with a separation of 10D, thus a separation of 10 times the diameter from the 90° bend.

Even comparison with the 20D measurement curve of FIG. 6 shows a clear improvement of the deviations from the ideal case. Thus, the ultrasonic flow measurement device of the invention achieves a better compensation of flow effects brought about by disturbances located upstream.

The invention claimed is:
1. An ultrasonic, flow measuring device, comprising:
a measuring tube having a straight measuring tube axis;
a transmitter for sending an acoustic signal on a first signal path;
a receiver for receiving the acoustic signal on the first signal path; and
a number of reflection surfaces, on which the acoustic signal is reflected at least once on the first signal path, wherein:

the first signal path is composed of straight subsections, with:
a) minimum separations of at least three subsections from the measuring tube axis (M) lie in the range 0.4-0.6 r, wherein r is the inner radius of the measuring tube;
b) a first subsection, which defines a first axially parallel plane, has a directly corresponding second subsection, which defines a second axially parallel plane, which two planes extend through a first reflection surface and the normal vectors enclose an angle of less than 10°;
c) a third subsection, which defines a third axially parallel plane, has a directly corresponding fourth subsection, which defines a fourth axially parallel plane, said two planes extend through a second reflection surface and the normal vectors enclose an angle of less than 10°, and the signal path describes in axial plan view a polygon, whose lateral points of intersection lie within, on or outside of the measuring tube,
wherein a fifth subsection is directly corresponding to said second subsection via a fifth reflection surface and wherein said third subsection directly corresponds to said fifth subsection via third reflection surface.

2. The ultrasonic, flow measuring device as claimed in claim 1, wherein:
third and fourth reflection surfaces are arranged consecutively on or in said measuring tube parallel to the measuring tube axis, and a fifth reflection surface and either:
said transmitter; or
said receiver; or
a sixth reflection surface are arranged consecutively on or in the measuring tube parallel to the measuring tube axis, the signal path is composed of six or less, straight sub paths.

3. The ultrasonic, flow measuring device as claimed in claim 1, wherein:
said transmitter, said receiver and said reflection surfaces are arranged or oriented in such a manner relative to one another in or on said measuring tube that the signal path describes in axial plan view a triangle, whose leg points of intersection lie within, on or outside of the measuring tube wall;
the first and second subsections of the signal path extend along a first leg of the triangle;
the first and second subsections of the signal path are subsections following consecutively, and that the third and fourth subsections of the signal path extend along a second leg of the triangle; and
the third and fourth subsections of the signal path are subsections following consecutively.

4. The ultrasonic, flow measuring device, as claimed in claim 1, wherein:
the second subsection is formed by reflection of the first subsection on a first of the reflection surfaces and;
the fourth subsection is formed by reflection of the third subsection on a second of the reflection surfaces.

5. The ultrasonic, flow measuring device as claimed in claim 1, wherein:
the two planes according to feature b) and/or feature c) extend through the first and/or the second reflection surface and the normal vectors enclose an angle of less than 5°.

6. The ultrasonic, flow measuring device as claimed in claim 1, wherein:
subsection bisecting points of at least three subsections have a separation of 0.45-0.55 r, from the measuring tube axis, wherein r is the inner radius of said measuring tube.

7. The ultrasonic, flow measuring device as claimed in claim 1, wherein:
the ultrasonic, flow measuring device takes into consideration a rotation compensation of rotating flows.

8. The ultrasonic, flow measuring device as claimed in claim 1, wherein:
said polygon is formed by a total of six subsections of the signal path.

9. The ultrasonic, flow measuring device, as claimed in claim 1, wherein:
said measuring tube has a first portion of reduced inner diameter for flow compensation.

10. The ultrasonic, flow measuring device, as claimed in claim 9, wherein:
the signal path extends within the first portion of said measuring tube.

11. The ultrasonic, flow measuring device as claimed in claim 9, wherein:
an angle of inclination between a second portion of said measuring tube with greater inner diameter and the first portion with reduced inner diameter amounts to less than 15°.

12. The ultrasonic, flow measuring device as claimed in claim 11, wherein:
an angle of inclination between a second portion of said measuring tube with greater inner diameter and the first portion with reduced inner diameter amounts to less than 10°.

13. The ultrasonic, flow measuring device as claimed in claim 11, wherein:
an angle of inclination between a second portion of said measuring tube with greater inner diameter and the first portion with reduced inner diameter amounts to less than 6-8°.

14. The ultrasonic, flow measuring device as claimed in claim 1, wherein:
said measuring tube has a front portion for rectifying the flow.

15. The ultrasonic, flow measuring device as claimed in claim 14, wherein:
the signal path extends in the flow direction following said front portion.

16. The ultrasonic, flow meter as claimed in claim 14, wherein:
a first portion with reduced inner diameter is arranged in the flow direction following said front portion.

17. The use of an ultrasonic, flow measuring device as claimed in claim 1 for determining flow velocity and/or volume flow of a medium flowing through said measuring tube following its flow through a bent-region of a pipeline.

18. The use of an ultrasonic, flow measuring device as claimed in claim 17, wherein:
the ultrasonic, flow measuring device is arranged with a distance of 20D or less from the bent region of the pipeline, wherein D corresponds to the diameter of the pipeline.

19. The use as claimed in claim 18, wherein:
the ultrasonic, flow measuring device is arranged with a distance of 10D or less from the bent region of a pipeline.

20. The ultrasonic, flow measuring device as claimed in claim 1, wherein:

the two planes according to feature b) and/or feature c) extend through the first and/or the second reflection surface and the normal vectors enclose an angle of less than 2°.

21. The ultrasonic, flow measuring device as claimed in claim 1, wherein:
the two planes according to feature b) and/or feature c) extend through the first and/or the second reflection surface and the normal vectors enclose an angle of less than 0.2°.

22. The use as claimed in claim 21, wherein:
the ultrasonic, flow measuring device is arranged with a distance of 5D or less from the bent region of a pipeline.

23. The use as claimed in claim 21, wherein:
the ultrasonic, flow measuring device is directly following the bent region of a pipeline.

24. The ultrasonic, flow measuring device as claimed in claim 1, wherein:
subsection bisecting points of at least three subsections have a separation of 0.48-0.52 r from the measuring tube axis, wherein r is the inner radius of said measuring tube.

* * * * *